(12) United States Patent
Tsai

(10) Patent No.: US 6,958,840 B2
(45) Date of Patent: Oct. 25, 2005

(54) DRIVING CIRCUIT FOR OPTICAL MODULATOR

(75) Inventor: Chia-Ming Tsai, Lujhou (TW)

(73) Assignee: Industrial Technology Research Institute, Hsinchu (TW)

( * ) Notice: Subject to any disclaimer, the term of this patent is extended or adjusted under 35 U.S.C. 154(b) by 30 days.

(21) Appl. No.: 10/814,028

(22) Filed: Mar. 31, 2004

(65) Prior Publication Data

US 2005/0083563 A1 Apr. 21, 2005

(30) Foreign Application Priority Data

Oct. 16, 2003 (TW) .............. 92128743 A

(51) Int. Cl.[7] .............. G02B 26/00; G02F 1/00
(52) U.S. Cl. .............. 359/237
(58) Field of Search .............. 359/237, 239, 359/180, 189, 187, 275; 318/667; 372/38.1, 372/38.02

(56) References Cited

U.S. PATENT DOCUMENTS 5,546,218 A * 8/1996 Komatsubara et al. ...... 359/237

OTHER PUBLICATIONS

"10 Gbit/s series-connected voltage-balancing pulse driver with direct-coupled current switches" Kanda et al.; Electronics Letters; Jun. 12, 2003.

* cited by examiner

Primary Examiner—Ricky L. Mack
Assistant Examiner—Brandi N. Thomas
(74) Attorney, Agent, or Firm—Thomas, Kayden, Horstemeyer & Risley

(57) ABSTRACT

A driving circuit of an optical modulator using cascode output structure including transistors to output an output voltage uniformly shared between the cascode transistors. Thus, the driving circuit outputs high driving voltage exceeding the toleration voltage of single transistor.

14 Claims, 5 Drawing Sheets

DRIVING CIRCUIT FOR OPTICAL MODULATOR

BACKGROUND OF THE INVENTION

1. Field of the Invention

The present invention relates in general to a driving circuit for an optical modulator including a cascode of electrical elements, wherein output voltage is uniformly shared between the transistors of the cascode electrical elements to increase the operating range of the output voltage.

2. Description of the Related Art

Optical transmission systems with high capacity are widely implemented. To meet requirements of high speed and long distance communication, optical transmitter employing continuous-wave (CW) laser diode operating with a high-speed optical modulator is crucial. The driving circuit of the optical modulator is typically manufactured by an integrated circuit process with high breakdown voltage to output high voltage between about 3~10 volts, thus increasing manufacturing cost. Hence, a method for forming the high-voltage driver with a low-voltage integrated circuit process is necessary.

FIG. 1 is a circuit diagram of a conventional driving circuit. The conventional driving circuit comprises transistors 10 and 11 and a current source $I_m$. Current source $I_m$ is directed to flow through the transistors 10 or 11 toward the output terminals Vo1 or Vo2 by the differential signals respectively input to the input terminals S1 and S2. The output voltages are output completely across the transistor 10 or 11. Thus, the output voltage value is limited by the breakdown characteristics of the transistors 10 and 11.

FIG. 2 is a circuit diagram of a conventional driving circuit comprising a cascode of transistors. The high voltage output terminal of the driving circuit comprises a plurality of transistors, wherein the second transistor 12, the third transistor 13, the fourth transistor 14 and the fifth transistor 15 comprise a cascode structure for sharing the high output voltage. The driving circuit however requires an extra source-follower to couple partial output voltage to the gate of the third transistor 13. Thus, power consumption is increased and the increment of the gate delay deteriorates the high frequency output characteristics.

To solve the disadvantages of the conventional driving circuit, the present invention provides a driving circuit for outputting high voltage.

SUMMARY OF THE INVENTION

The object of the present invention is thus to provide a driving circuit for an optical modulator including a cascode of output structures, wherein output voltage is uniformly shared between the transistors of the cascode structures to increase operating range of the output voltage.

In addition, output voltage of the driving circuit is uniformly shared between the cascode transistors by using feedback voltage provided by passive components, such as resistors and capacitors. Thus, a damage to the output transistors due to output voltage exceeding a voltage tolerance range is prevented. Additionally, output voltage is doubled by the cascode of output stages without influencing the circuit operation.

Moreover, a base control signal of the upper cascode transistors is generated by a gain unit and the value of the high frequency signal fed back from the output terminal is controlled by adjusting the capacitance ratio of two capacitors to obtain an optimized output waveform.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 2:
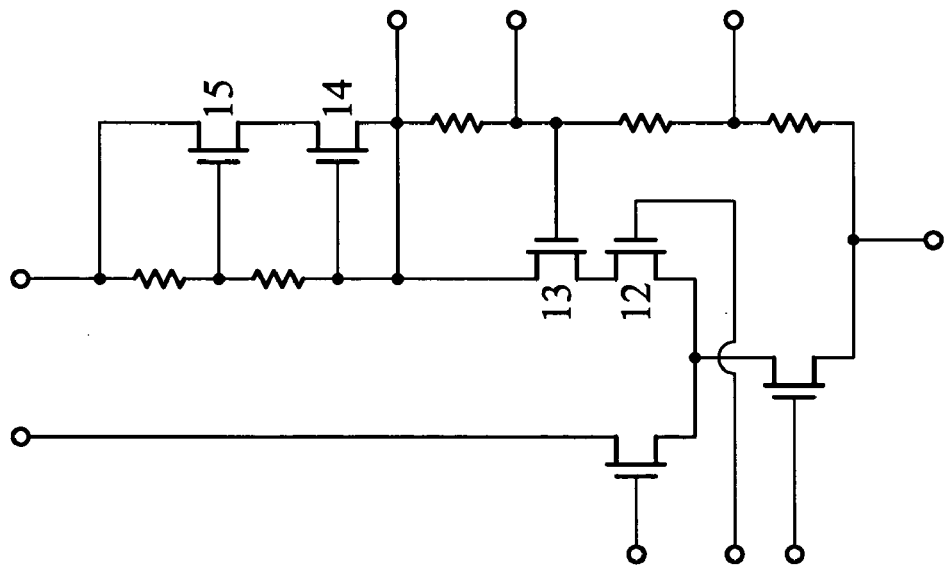
FIG. 2 is a circuit diagram of another conventional driving circuit.
Figure 1:
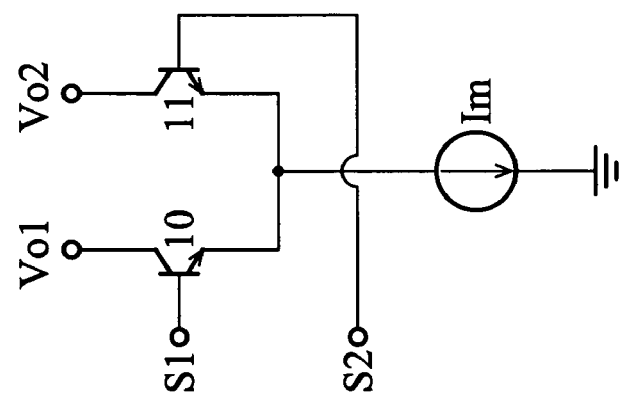
FIG. 1 is a circuit diagram of a conventional driving circuit.
Figure 3:
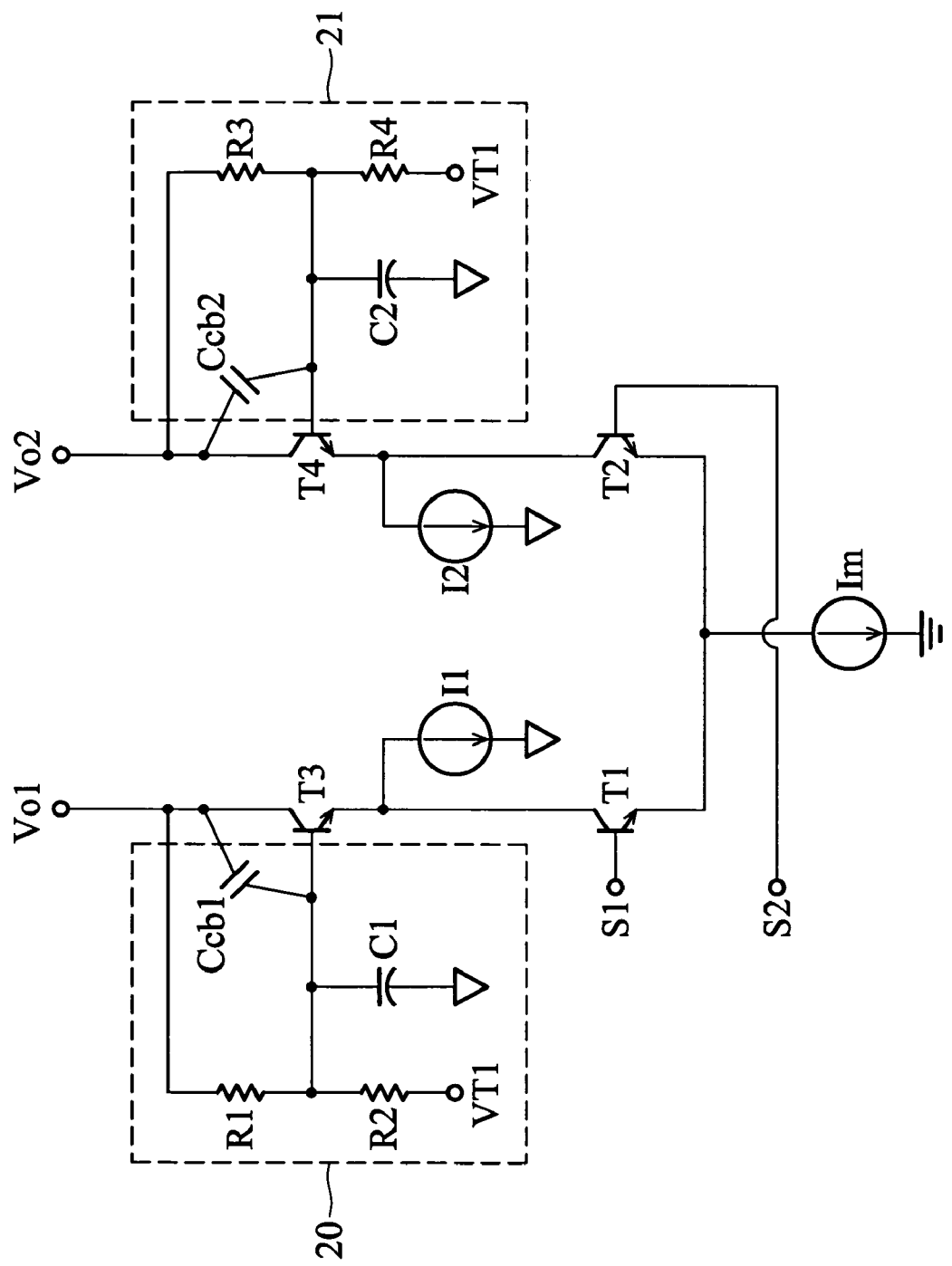
FIG. 3 is a circuit diagram of a driving circuit according to first embodiment of the present invention.

FIG. 3 is a circuit diagram of a driving circuit according to first embodiment of the present invention.

The driving circuit according to the first embodiment of the present invention comprises input terminals S1 and S2. First transistor T1 is connected to input terminal S1, and second transistor T2 is connected to input terminal S2. In addition, the emitters of first transistor T1 and second transistor T2 are connected and are further connected to ground through current source $I_m$.

Additionally, first transistor T1 is connected to third transistor T3 in serial, and the connection point of first transistor T1 and third transistor T3 is connected to first current source I1. Second transistor T2 is connected to fourth transistor T4 in serial, and the connection point of second transistor T2 and fourth transistor T4 is connected to second current source I2. First current source I1 and second current source I2 respectively provide bias current of third transistor T3 and fourth transistor T4 to decrease switching time of transistors and avoid output waveform distortion.

In addition, third transistor T3 connected to first transistor T1 and first current source I1 is further connected to first feedback circuit 20. First feedback circuit 20 comprises a low frequency feedback circuit and a high frequency feedback circuit. The low frequency feedback circuit comprises a first resistor R1 and a second resistor R2. A feedback signal with lower frequency is controlled by the ratio of first resistor R1 to second resistor R2. The high frequency feedback circuit comprises an equivalent collector-base capacitor Ccb1 of third transistor T3 and first capacitor C1. A feedback signal with higher frequency is controlled by the ratio of collector-base capacitor Ccb1 to first capacitor C1.

Fourth transistor T4 connected to second transistor T2 and second current source I2 is further connected to second feedback circuit 21. Second feedback circuit 21 comprises a low frequency feedback circuit and a high frequency feedback circuit as first feedback circuit 20. The low frequency feedback circuit comprises a third resistor R3 and a fourth resistor R4. A feedback signal with lower frequency is controlled by the ratio of third resistor R3 to fourth resistor R4. The high frequency feedback circuit comprises an equivalent collector-base capacitor Ccb2 of fourth transistor T4 and second capacitor C2. A feedback signal with higher frequency is controlled by the ratio of collector-base capacitor Ccb2 to second capacitor C2. Second resistor R2 and fourth resistor R4 are all connected to reference voltage VT1. Additionally, the cascode resistors of feedback circuits 20 and 21 can also act as back termination resistors to improve impedance matching.

The principal design spirit of the present invention is not limited by the first embodiment. Thus, other high voltage driving circuits with a cascode of structures are provided by other embodiments.

Figure 4:
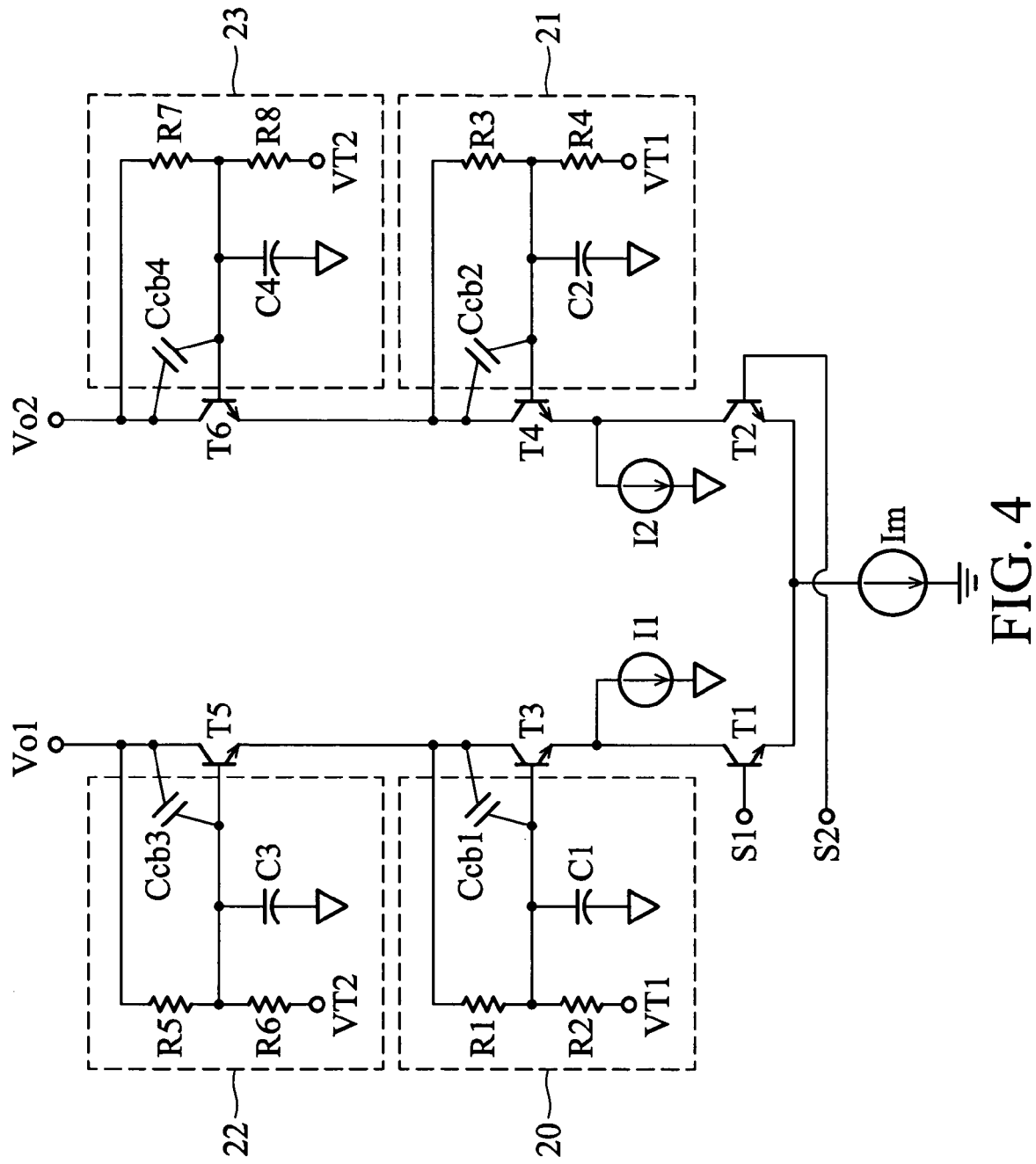
FIG. 4 is a circuit diagram of a driving circuit according to second embodiment of the present invention.

FIG. 4 is a circuit diagram of a driving circuit according to second embodiment of the present invention. The differences between first and second embodiments are described in the following. Third transistor T3 is further connected to fifth transistor T5 to form a cascode of structures with more stages.

Fifth transistor T5 connected to third transistor T3 is further connected to third feedback circuit 22. Third feedback circuit 22 comprises a low frequency feedback circuit and a high frequency feedback circuit as feedback circuits 20 and 21. A feedback signal with lower frequency is controlled by the ratio of fifth resistor R5 to sixth resistor R6, and a feedback signal with higher frequency is controlled by the ratio of equivalent collector-base capacitor Ccb3 of fifth transistor T5 to third capacitor C3.

Fourth transistor T4 is further connected to sixth transistor T6 to form a cascode of structures with more stages. Sixth transistor T6 connected to fourth transistor T4 is further connected to fourth feedback circuit 23 comprising a low frequency feedback circuit and a high frequency feedback circuit. A feedback signal with lower frequency is controlled by the ratio of seventh resistor R7 to eighth resistor R8, and a feedback signal with higher frequency is controlled by the ratio of equivalent collector-base capacitor Ccb4 of sixth transistor T6 to fourth capacitor C4.

Sixth resistor R6 and eighth resistor R8 are all connected to reference voltage VT2. The cascode resistors of feedback circuits 22 and 23 further act as back termination resistors to improve impedance matching.

The feature of the second embodiment of the present invention is the triple output voltage using a cascode of structures according to the design spirit of the present invention.

Figure 5:
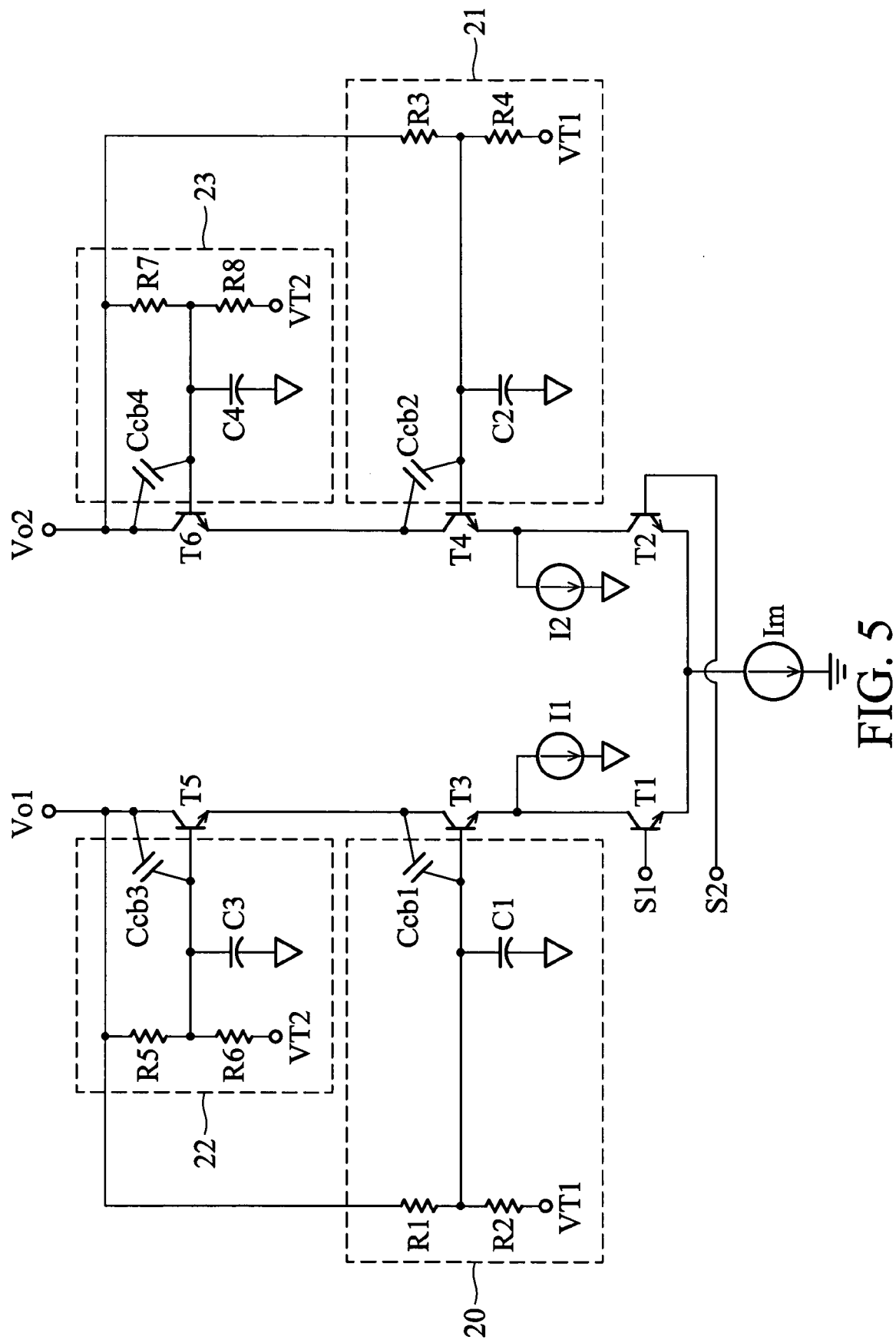
FIG. 5 is a circuit diagram of a driving circuit according to third embodiment of the present invention.

FIG. 5 is a circuit diagram of a driving circuit according to third embodiment of the present invention. The difference between second and third embodiments is first resistor R1 of first feedback circuit 20 and third resistor R3 of second feedback circuit 21 are respectively connected to output terminals Vo1 and Vo2. Thus, low frequency feedback circuits of third feedback circuit 22 and first feedback circuit 20 are connected, and low frequency feedback circuits of fourth feedback circuit 23 and second feedback circuit 21 are connected. Other circuitry connections and operation are the same as in the second embodiment.

Moreover, the cascode resistors of feedback circuit 20 and 21 in first embodiment can be replaced by a voltage gain circuit.

Figure 6:
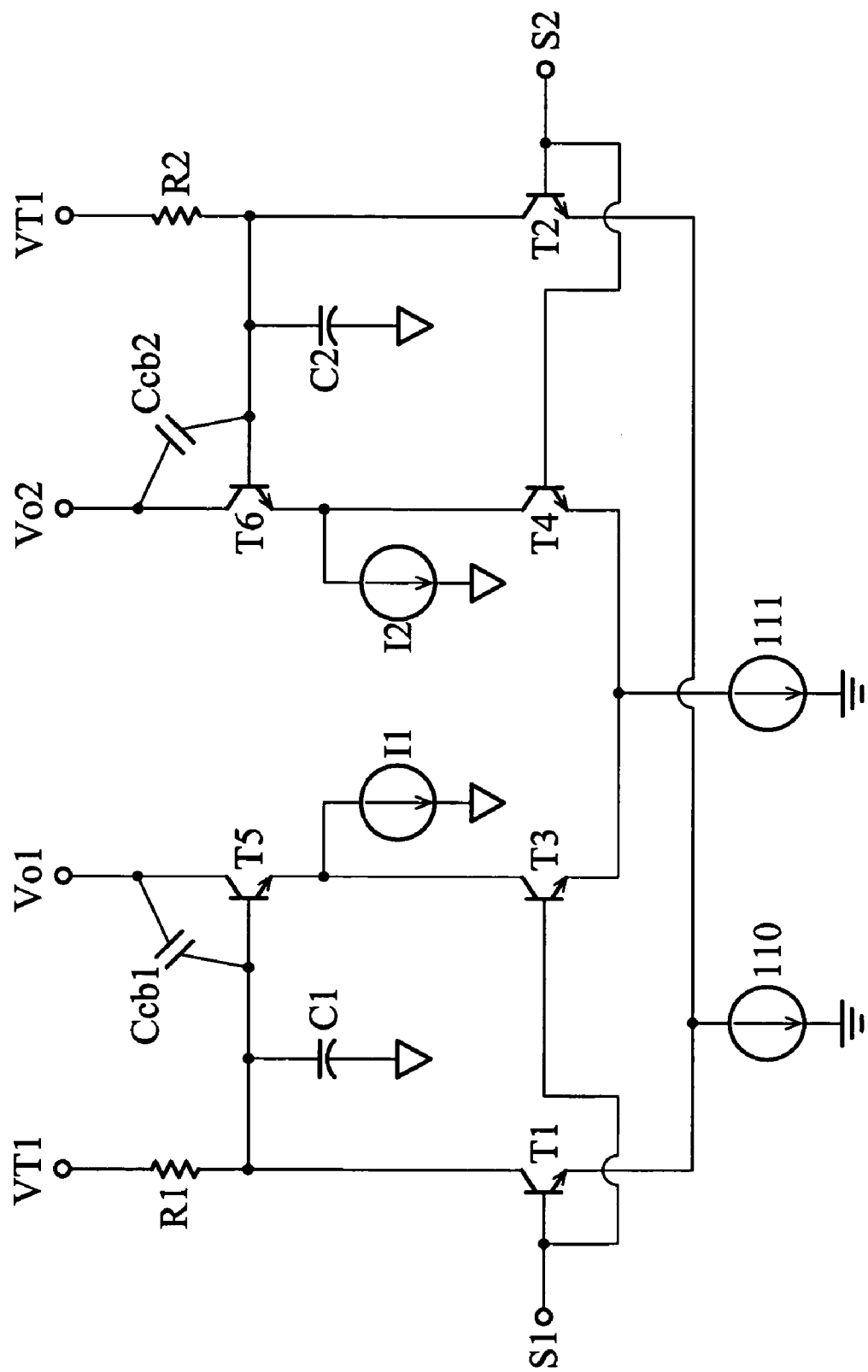
FIG. 6 is a circuit diagram of a driving circuit according to fourth embodiment of the present invention.

FIG. 6 is a circuit diagram of a driving circuit according to fourth embodiment of the present invention. The emitters of first transistor T1 and second transistor T2 are connected to a first reference current source I10. Additionally, first transistor T1 is connected to first input terminal S1 and first resistor R1, second transistor T2 is connected to second input terminal S2 and second resistor R2, and resistors R1 and R2 are respectively connected to reference voltage VT1.

Input terminals S1 and S2 are further connected to third resistor T3 and fourth resistor T4. The emitters of transistors T3 and T4 are connected to a second reference current source I11. In addition, third transistor T3 is connected to first current source I1 and connected to fifth transistor T5 in serial, and fourth transistor T4 is connected to second current source I2 and connected to sixth transistor T6 in serial. Fifth transistor T5 is connected to first current I1, and first current I1 is connected to the connection point of third transistor T3 and fifth transistor T5. The base of fifth transistor T5 is connected to first capacitor C1 and first resistor R1. A first high frequency feedback circuit comprises collector-base capacitor Ccb1 of fifth transistor T5 and first capacitor C1. In addition, sixth transistor T6 is connected to second current source I2, and second current I2 is connected to the connection point of fourth transistor T4 and sixth transistor T6. The base of sixth transistor T6 is connected to second capacitor C2 and second resistor R2. A second high frequency feedback circuit comprises collector-base capacitor Ccb2 of sixth transistor T6 and second capacitor C2.

Similar with first embodiment, the high frequency signal fed back from the output terminal is controlled by adjusting the capacitance ratio of first capacitor C1 and collector-base capacitor Ccb1, and that of second capacitor C2 and collector-base capacitor Ccb2 to obtain an optimized output waveform. In addition, resistor R1 and R2 comprise a resistor set connected to reference voltage VT1.

In the fourth embodiment, resistors R1, R2, R3, and R4 are replaced by a voltage gain circuit to provide a low frequency base control signal, hence output voltage is shared between the transistors of the cascode structures.

According to the embodiments of the present invention, output voltage is uniformly shared and high output voltage is easily obtained by the cascode output stage comprising a plurality of transistors.

The foregoing description of the invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A driving circuit for an optical modulator, comprising:
   a first transistor coupled to a first input terminal and a current source;
   a second transistor coupled to the first transistor, the current source, and a second input terminal, wherein the current source is coupled to a connection point of the first transistor and the second transistor;
   a third transistor coupled to the first transistor in serial and coupled to a first current source, wherein the first current source is coupled to a connection point of the first transistor and the third transistor;
   a fourth transistor coupled to the second transistor in serial and coupled to a second current source, wherein the second current source is coupled to a connection point of the second transistor and the fourth transistor;
   a first feedback circuit coupled to the third transistor, wherein the first feedback circuit comprises a first low frequency feedback circuit and a first high frequency feedback circuit coupled to the first low frequency feedback circuit; and a second feedback circuit coupled to the fourth transistor, wherein the second feedback circuit comprises a second low frequency feedback circuit and a second high frequency feedback circuit coupled to the second low frequency feedback circuit.

2. The driving circuit for an optical modulator as claimed in claim 1, wherein the first low frequency feedback circuit comprises a first resistor, and a second resistor coupled to the first resistor and a reference voltage.

3. The driving circuit for an optical modulator as claimed in claim 1, wherein the first high frequency feedback circuit comprises a first capacitor, and a collector-base capacitor coupled between the collector and base of the third transistor.

4. The driving circuit for an optical modulator as claimed in claim 1, wherein the second low frequency feedback circuit comprises a third resistor, and a fourth resistor coupled to the third resistor and a reference voltage.

5. The driving circuit for an optical modulator as claimed in claim 1, wherein the second high frequency feedback circuit comprises a second capacitor, and a collector-base capacitor coupled between the collector and base of the fourth transistor.

6. The driving circuit for an optical modulator as claimed in claim 1, wherein the third transistor is coupled to a fifth transistor in serial, the fourth transistor is coupled to a sixth transistor in serial, the fifth transistor is coupled to a third feedback circuit comprising a third low frequency feedback circuit and a third high frequency feedback circuit coupled to the third low frequency feedback circuit, and the sixth transistor is coupled to a fourth feedback circuit comprising a fourth low frequency feedback circuit and a fourth high frequency feedback circuit coupled to the fourth low frequency feedback circuit 7. The driving circuit for an optical modulator as claimed in claim 6, wherein the third low frequency feedback circuit comprises a fifth resistor, and a sixth resistor coupled to the fifth resistor and a reference voltage.

8. The driving circuit for an optical modulator as claimed in claim 6, wherein the third high frequency feedback circuit comprises a third capacitor, and a collector-base capacitor coupled between the collector and base of the fifth transistor.

9. The driving circuit for an optical modulator as claimed in claim 6, wherein the fourth low frequency feedback circuit comprises a seventh resistor, and an eighth resistor coupled to the seventh resistor and a reference voltage.

10. The driving circuit for an optical modulator as claimed in claim 6, wherein the fourth high frequency feedback circuit comprises a fourth capacitor, and a collector-base capacitor coupled between the collector and base of the sixth transistor.

11. The driving circuit for an optical modulator as claimed in claim 6, wherein the third low frequency feedback circuit is coupled to the first low frequency feedback circuit, and the fourth low frequency feedback circuit is coupled to the second low frequency feedback circuit.

12. A driving circuit for an optical modulator, comprising:

a first transistor coupled to a first input terminal, a first reference current source and a first resistor coupled to a reference voltage;

a second transistor coupled to the first transistor, the first reference current source, a second input terminal and a second resistor, wherein the first reference current source is coupled to a connection point of the first transistor and the second transistor, and the second resistor is coupled to the reference voltage;

a third transistor coupled to the first input terminal and a second reference current source;

a fourth transistor coupled to the second input terminal, the third transistor and the second reference current source, wherein the second reference current source is coupled to a connection point of the third transistor and the fourth transistor;

a fifth transistor coupled to the third transistor in serial and coupled to a first current source and a first high frequency feedback circuit, wherein the first current source is coupled to a connection point of the third transistor and the fifth transistor; and a sixth transistor coupled to the fourth transistor in serial and coupled to a second current source and a second high frequency feedback circuit, wherein the second current source is coupled to a connection point of the fourth transistor and the sixth transistor.

13. The driving circuit for an optical modulator as claimed in claim 12, wherein the first high frequency feedback circuit comprises a first capacitor, and a collector-base capacitor coupled between the collector and base of the fifth transistor.

14. The driving circuit for an optical modulator as claimed in claim 12, wherein the second high frequency feedback circuit comprises a second capacitor, and a collector-base capacitor coupled between the collector and base of the sixth transistor.

* * * * *